(12) United States Patent
Rader et al.

(10) Patent No.: US 7,625,537 B2
(45) Date of Patent: Dec. 1, 2009

(54) INTEGRATED DRY AND WET FLUE GAS CLEANING PROCESS AND SYSTEM

(75) Inventors: Philip C. Rader, Knoxville, TN (US); Raymond R. Gansley, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 444 days.

(21) Appl. No.: 11/451,745

(22) Filed: Jun. 12, 2006

(65) Prior Publication Data
US 2008/0044332 A1 Feb. 21, 2008

(51) Int. Cl.
B01D 46/00 (2006.01)
B01D 53/50 (2006.01)
B01D 53/64 (2006.01)
B01D 53/75 (2006.01)

(52) U.S. Cl. ............... 423/210; 423/242.1; 423/243.01; 423/243.08; 423/240 R; 423/215.5; 422/168; 422/169; 422/170

(58) Field of Classification Search .................. 423/210, 423/242.1, 243.01, 243.08, 240 R, 215.5; 422/168, 169, 170
See application file for complete search history.

(56) References Cited

U.S. PATENT DOCUMENTS

| | | | |
|---|---|---|---|
| 4,472,364 A * | 9/1984 | Bauerle et al. | 423/243.09 |
| 4,620,856 A | 11/1986 | Rosenberg et al. | |
| 5,814,288 A | 9/1998 | Madden et al. | |
| 6,143,263 A * | 11/2000 | Johnson et al. | 423/242.1 |
| 6,531,104 B1 | 3/2003 | Borio et al. | |

FOREIGN PATENT DOCUMENTS

| | | | |
|---|---|---|---|
| DE | 4124844 A | | 1/1993 |
| DE | 43 39 072 A1 * | | 5/1995 |
| DE | 4339072 A | | 5/1995 |
| DE | 4404284 A | | 8/1995 |
| JP | 59-132921 A * | | 7/1984 |
| JP | 59132921 A | | 7/1984 |
| JP | 62102817 A | | 5/1987 |

OTHER PUBLICATIONS

International Searching Authority, "International Search Report and the Written Opinion," sent Sep. 27, 2007 in regards to International Application No. PCT/US2007/068549.
European Patent Office, "Patent Abstract of Japanese Patent 59132921", dated Jul. 31, 1984.
European Patent Office, "Patent Abstract of Japanese Patent 62102817", dated May 13, 1987.

* cited by examiner

*Primary Examiner*—Timothy C Vanoy
(74) *Attorney, Agent, or Firm*—Wiggin and Dana LLP; Anthony P. Gangemi

(57) ABSTRACT

A process and system for removing sulfur oxide, other gases, and particulate from a flue gas. The process includes treating flue gas with a slurry formed from water, an alkaline reagent, and the purge stream from a wet scrubber in a spray dryer, thereby producing a dry by-product. The process further includes filtering the flue gas to remove at least a portion of the dry by-product, wet scrubbing the flue gas exiting the filter in a wet scrubber, adding a lime or limestone reagent to the wet scrubber, and producing gypsum. Activated carbon may be injected into the flue gas upstream of the filtering step and particulate may be removed from the flue gas upstream of the spray dryer.

13 Claims, 3 Drawing Sheets

INTEGRATED DRY AND WET FLUE GAS CLEANING PROCESS AND SYSTEM

BACKGROUND OF THE INVENTION (1) Field of the Invention

The present invention generally relates to a system for removing sulfur oxides, other acid gases, particulate, and mercury from the flue gas of a fossil fuel fired combustor. In particular, the present invention is directed to an integrated dry/wet flue gas cleaning system.

(2) Description of the Related Art

Fossil fuel fired combustors and the like can generate large quantities of sulfur oxides and other acid gases. The sulfur oxides are emitted into the atmosphere through the flue gases from the combustors. The combustion process converts naturally occurring sulfur in the coal to gaseous sulfur dioxide ($SO_2$), a criteria pollutant and precursor to acid rain, and sulfuric acid mist formed by condensation of sulfur trioxide ($SO_3$), a precursor to PM2.5 and cause of visible emissions. PM2.5 refers to particulate matter that is 2.5 micrometers or smaller in size. Fine particles are of concern because they are risk to both human health and the environment. Other undesirable acid gas pollutants such as hydrogen chloride (HCl) and hydrogen fluoride (HF) may also be produced.

Clean and environmentally sound power generation and waste incineration requires economical air pollution control systems. Air pollution control systems are sometimes complex, and typically consist of stages for the removal of particulate, acid compounds, organic substances, heavy metals, as well as the disposal of by-products from these processes.

Two process types currently used to remove sulfur oxides from flue gas are wet flue gas desulfurization (WFGD) and dry flue gas desulfurization (DFGD). In WFGD, the flue gas enters a large vessel, e.g., a spray tower or absorber, which is generally referred to as a wet scrubber, where it is sprayed with an aqueous slurry, e.g., a mixture of water and at least partially insoluble matter, e.g., an alkaline matter such as lime, limestone, or the like. The calcium in the slurry reacts with the $SO_2$ to form calcium sulfite or calcium sulfate. The calcium sulfite and/or sulfate is dewatered by various means to produce a solid by-product. When the by-product is primarily calcium sulfite, it is usually mixed with fly ash and fixative lime and disposed of in landfills. Alternatively, salable gypsum can be produced from the WFGD waste product by injecting compressed air in the wet scrubber.

In DFGD, a water slurry, e.g., water mixed with quicklime to form calcium hydroxide or similar, is introduced into a spray dryer tower. The slurry is atomized and injected into the flue gases where droplets react with $SO_2$ as they evaporate in the vessel. The resulting dry waste product is collected in the bottom of the spray dryer and in particulate removal equipment, e.g., an electrostatic precipitator (ESP) or bag filter. Typically, the dry waste product is collected from the particulate removal equipment and disposed of in landfills.

WFGD typically has high capital costs due to the use of expensive corrosion resistant materials and extensive reagent and by-product handling systems. WFGD systems typically produce a liquid purge stream, which must be treated prior to disposal, and may produce a sulfur trioxide ($SO_3$) acid mist emission, which is a pollutant that results in objectionable visible emissions and is a precursor to PM2.5. With existing WFGD technology, the $SO_3$ mist must be eliminated by costly means such as Wet Electrostatic Precipitators (WESP) or alkali injection. Alternative desulfurization methods such as ammonia scrubbing are available, but are generally not economically competitive with existing wet and dry methods.

DFGD may be expensive to operate due to the relatively inefficient use of costly lime reagent and may create a solid waste disposal problem. The present dry sulfur removal methods generally fail to alleviate issues such as low percentages of sulfur oxide removal and poor reagent utilization. Often, spray drying is sensitive to operating conditions, making it difficult to maximize results. Depending on the amount of oxides present, the temperature must be adjusted precisely to create the desired reaction. Because the temperature must be maintained in a narrow range, the performance of the process is typically reduced. DFGD systems do, however, have the advantage of high $SO_3$ removal efficiency thus avoiding problems stated above related to acid mist emissions.

BRIEF SUMMARY OF THE INVENTION

One aspect of the present invention is a process for removing sulfur oxides, other acid gases, and particulate from a flue gas. The process includes the following steps: treating the flue gas utilizing a slurry formed from water, an alkaline reagent, and a purge stream from a wet scrubber in a spray dryer, wherein a portion of the acid gases is removed from the flue gas and a dry by-product is produced and the purge stream is evaporated; filtering the flue gas to remove fly ash and at least a portion of the dry by-product and causing further reduction of the acid gases; wet scrubbing the flue gas exiting the spray dryer in a wet scrubber as a polishing step for removal of acid gases and particulate; adding a lime or limestone reagent to the wet scrubber, wherein the lime or limestone reagent reacts with at least a portion of the remaining acid gases present in the wet scrubber to produce a wet scrubber by-product; discharging the purge stream from the wet scrubber to the spray dryer; and producing gypsum from the wet scrubber by-product.

Another aspect of the present invention is a process for removing sulfur oxide, other acid gases, and particulate from a flue gas. The process includes the following steps: spray dry absorbing the flue gas and a slurry formed from water, an alkaline reagent, and a portion of a by-product from a wet scrubber in a spray dryer, wherein a dry by-product is produced in the spray dry absorbing step; filtering the flue gas to remove at least a portion of the dry by-product; and wet scrubbing the flue gas exiting the spray dryer.

Yet another aspect of the present invention is a system for removing sulfur oxide, other acid gases, and particulate from a flue gas. The system includes a spray dryer, a filter, and a wet scrubber. The spray dryer is for treating the flue gas and a slurry formed from water and an alkaline reagent. A dry by-product is produced in the spray dryer. The filter is for removing at least a portion of the dry by-product from the flue gas, and the wet scrubber is for scrubbing the flue gas exiting the spray dryer by utilizing the dry by-product removed from the flue gas in a wet scrubber as reagent.

Still another aspect of the present invention is a process for removing sulfur oxides, other acid gases, and particulate from a flue gas. The process includes the following steps: treating the flue gas utilizing a slurry formed from water and an alkaline reagent in a spray dryer, wherein a portion of the acid gases is removed from the flue gas and a dry by-product is produced; filtering the flue gas to remove fly ash and at least a portion of the dry by-product and causing further reduction of the acid gases; adding the dry by-product to the wet scrubber; wet scrubbing the flue gas exiting the spray dryer in a wet scrubber as a polishing step for removal of acid gases and particulate; and adding a lime or limestone reagent to the wet scrubber, wherein the lime or limestone reagent reacts with at least a portion of the remaining acid gases present in the wet scrubber to produce a wet scrubber by-product.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION

Figure 1:
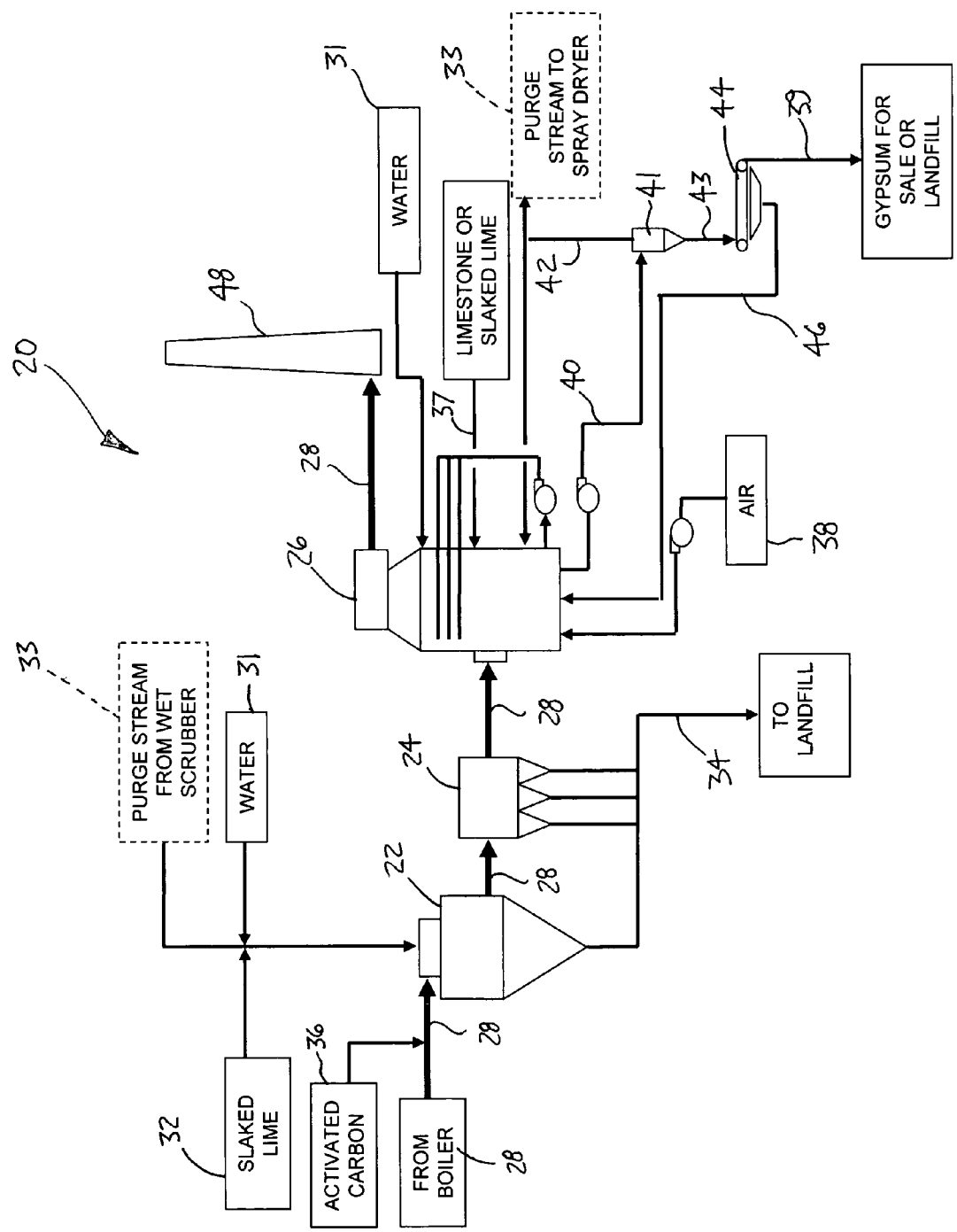
FIG. 1 is a schematic view of a system according to one embodiment of the present invention.

Referring now to the drawings in which like reference numerals indicate like parts, and in particular, to FIG. 1, one aspect of the present invention is a process 20 of integrating wet and dry flue gas cleaning technologies. The process of the present invention includes using a spray dryer 22, a particulate collector 24, which may be a fabric filter, an electrostatic precipitator, or the like, and a wet scrubber 26 to remove sulfur oxides, other acid gases, particulate, and mercury from a flue gas 28.

In process 20, which is illustrated in FIG. 1, flue gas 28, which comes from a combustor, e.g., a boiler (not shown), first enters spray dryer 22. As used herein, flue gas 28 refers generally to any flue gas created from fossil fuel combustion and the particular constituents that make-up the flue gas are expected to vary as the flue gas is treated. While being spray dry absorbed in spray dryer 22, flue gas 28 is reacted with a slurry 30 containing water 31, an alkaline reagent 32 such as lime, limestone, sodium carbonate, or the like, and a purge stream 33 from wet scrubber 26. Slurry 30 is developed using processes and equipment known in the art. Similar to a conventional dry flue gas desulfurization system, the temperature and humidity in spray dryer 22 are controlled in order to produce a dry by-product 34 and to remove acid gases such as $SO_2$, $SO_3$, HCl, and HF.

Next, flue gas 28 exits spray dryer 22 and enters particulate collector 24 where at least a portion of dry by-product 34 and fly ash is removed. In one embodiment, an activated carbon 36 may be injected into flue gas 28 upstream of particulate collector 24 in an effort to remove mercury from the flue gas. The presence of alkaline reagent 32 in the filter cake, i.e., filtered dry product 34, results in further capture of sulfur oxides and acid gases. Dry by-product 34, which is substantially removed from flue gas 28 by particulate collector 24, is discarded. Typically, particulate collector 24 is a fabric filter. However, as one skilled in the art will appreciate, other types of filtration systems and other types of filters or electrostatic precipitators may be utilized.

Flue gas 28 then exits particulate collector 24 and is next treated in wet scrubber 26, where additional removal of sulfur oxides, acid gases, particulate, and mercury occurs. A lime or limestone reagent 37 may be added to wet scrubber 26 to cause a react with the acid gases present in the wet scrubber. In addition, air 38 may be injected into wet scrubber 26 to produce a gypsum 29. Wet scrubber 26 produces a by-product 40, which may be processed in a solids/liquid separator 41, such as a hydrocyclone or similar, to remove a portion of a liquid 42 contained therein. Liquid 40 is typically recycled back to wet scrubber 26. A portion of liquid 42 that defines purge stream 33 may be discharged from wet scrubber 26 to control fine particle and/or dissolved solids such as chloride accumulation, which is undesirable in slurry 30. FIG. 1 illustrates one system for generating purge stream 33. However, other systems of generating purge stream 33 are contemplated by the present invention. An underflow 43 from separator 41 may be further processed in a filter 44, e.g., a vacuum filter or similar, to produce dried gypsum 39, which may be sold or disposed of in a landfill. A filtrate 46 from filter 44 may be returned to wet scrubber 26. The remaining treated flue gas 28 exits wet scrubber 26 and is typically exhausted to the atmosphere through a conventional stack 48.

Figure 2:
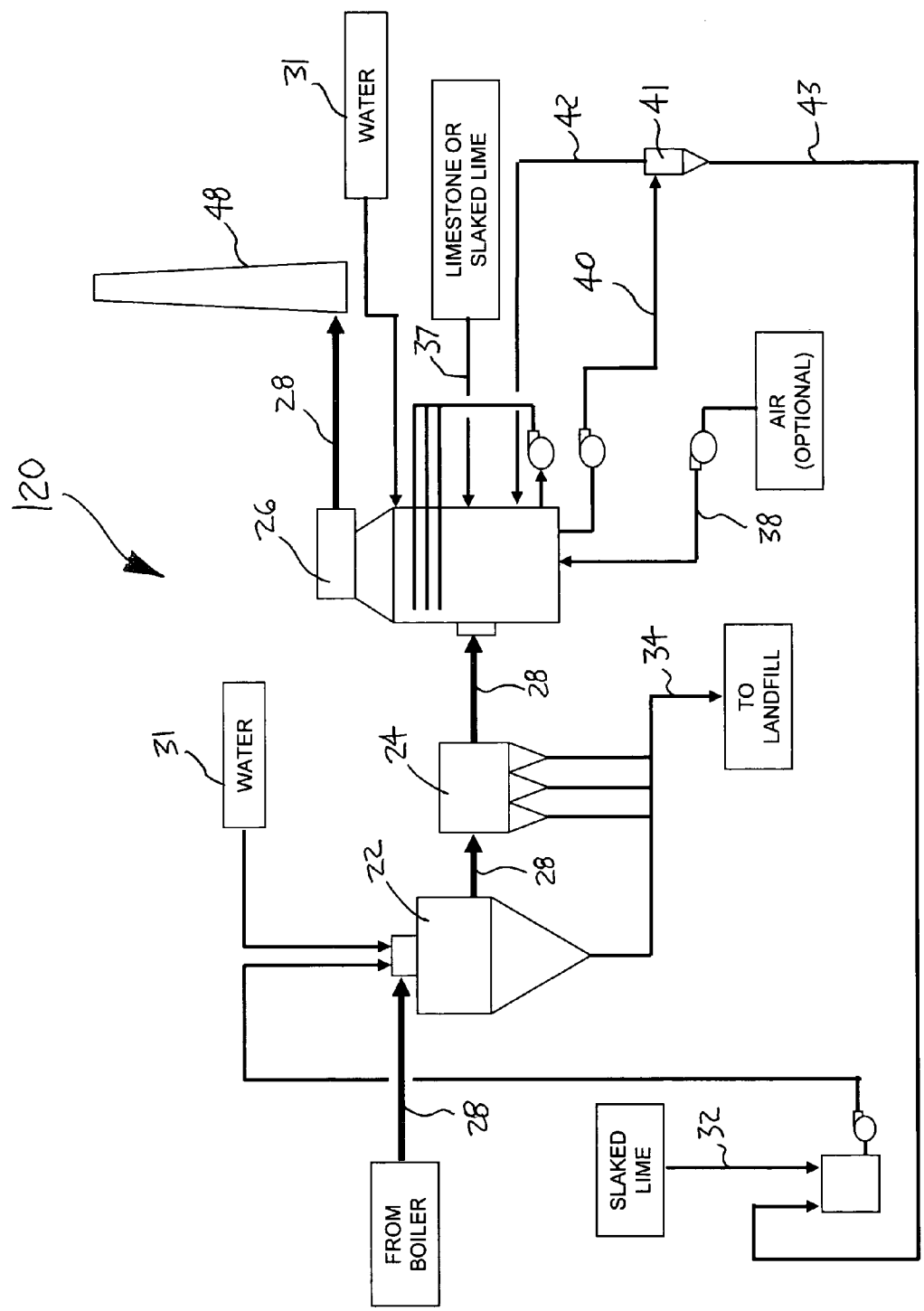
FIG. 2 is a schematic view of a system according to another embodiment of the present invention.

Referring now to FIG. 2, another embodiment of the present invention includes a process 120. With the exception of the differences described below, process 120 is substantially similar to or identical to process 20 as indicated by similar of identical element numbers. As in the description of process 20, with respect to process 120, flue gas 28 refers generally to any flue gas and the particular constituents that make-up the flue gas are expected to vary as the flue gas is treated. One way that process 120 differs from process 20 is that by-product 40 may be partially dewatered in separator 41. A portion of by-product 40, an underflow 43 from separator 41, is generally mixed with alkaline reagent 32 and fed to spray dryer 22. Overflow from separator 41, i.e., liquid 42, is returned to wet scrubber 26. In process 120, underflow 43 from separator 41 is recycled rather than processed to form gypsum 39. A single, dry by-product 34 is typically disposed of in a landfill. Either lime or limestone reagent 37 may be utilized in wet scrubber 26. Typically, limestone is economically preferred. As in process 20, water 31 is added to spray dryer 22 and wet scrubber 26 for temperature and level control, respectively. Optionally, air 38 may be injected into wet scrubber 26 to produce gypsum 39.

Figure 3:
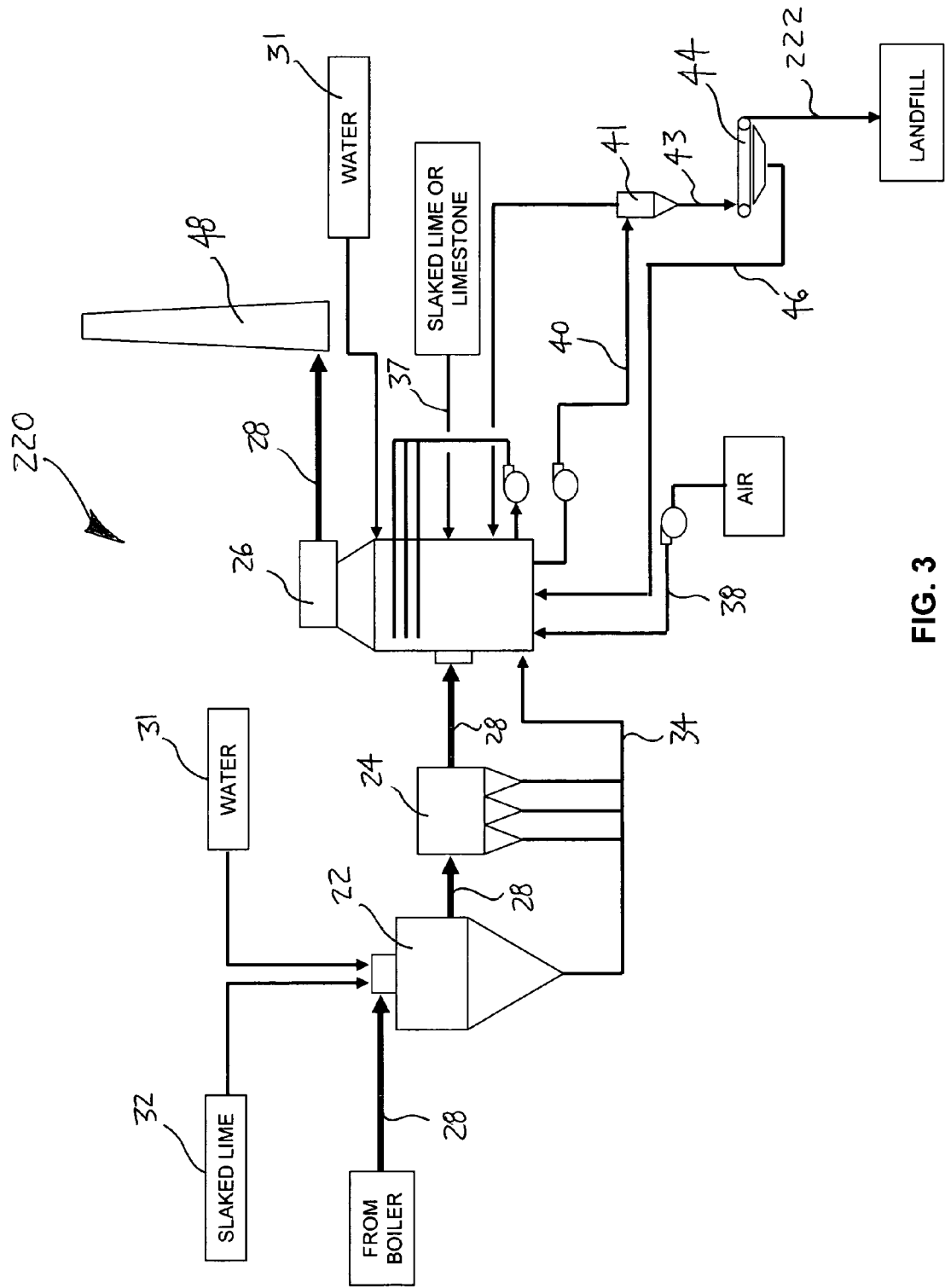
FIG. 3 is a schematic view of a system according to another embodiment of the present invention.

Referring now to FIG. 3, another embodiment of the present invention includes a process 220. With the exception of the differences described below, process 220 is substantially similar to or identical to process 20 as indicated by similar of identical element numbers. As in the description of process 20, with respect to process 220, flue gas 28 refers generally to any flue gas and the particular constituents that make-up the flue gas are expected to vary as the flue gas is treated. One way that process 220 differs from process 20 is that DFGD by-product 34 is sent to wet scrubber 26 where unreacted alkaline reagent 32 contributes to $SO_2$ removal and partially offsets the need for addition of lime or limestone reagent 37. DFGD by-product 34 and WFGD by-product 40 are combined in wet scrubber 26 and ultimately co-disposed as a waste by-product stream 222. Waste by-product stream 222 is generally disposed of in a landfill.

A dry/wet flue gas cleaning system according to the present invention offers advantages over prior art designs in that the combination of dry flue gas cleaning technology such as a spray dryer and wet flue gas cleaning technology such as a wet scrubber allows for high removal efficiency of sulfur oxides with very low acid mist emissions. About 50 to 99.9 percent of the sulfur trioxide and other acid gases along with a portion of any sulfur dioxide present are removed from the flue gas in the spray dry absorbing treating step and about 50 to 99.9 percent of the remaining sulfur oxides and other acid gases are removed from the flue gas in the wet scrubbing step. In order to reduce operating costs associated with lime usage, the spray dryer may be operated in such a manner as to minimize the absorption of $SO_2$ while still removing 50 to 99.9 percent of the $SO_3$ and other acid gases. The removal of sulfur oxides, specifically sulfur trioxide ($SO_3$), by spray dry absorbing avoids issues of opacity and visible emissions downstream of the wet scrubber, thereby eliminating the need for costly mitigation measures such as wet electrostatic precipitator or alkali injection.

In addition, the spray drying of the wet scrubber purge stream eliminates the need for costly wastewater treatment equipment that would otherwise be required to treat the purge steam 33 of process 20.

A further advantage of this invention is that because chlorides are removed during the spray dry absorbing step, the wet scrubber may be constructed of low-cost materials. Typically, expensive material such as alloy steel or other corrosion resistant materials are required due the presence of chloride in the scrubbing slurry. In addition, any chlorides from the flue gas, the water, or otherwise, that may reach the wet scrubber would also be reduced by removing purge stream 33 wet scrubber 26.

Additionally, the present invention has the advantage of high mercury removal with an activated carbon injection in the fabric filter.

Finally, utilizing the co-current product flow embodiments in process 220 allows for near-complete lime utilization and the elimination of costly vacuum filtration equipment.

Although the invention has been described and illustrated with respect to exemplary embodiments thereof, it should be understood by those skilled in the art that the foregoing and various other changes, omissions and additions may be made therein and thereto, without parting from the spirit and scope of the present invention. Accordingly, other embodiments are within the scope of the following claims.

What is claimed is:

1. A process for removing sulfur oxides, other acid gases, and particulate from a flue gas, said process comprising:
    treating the flue gas utilizing a slurry formed from water, lime, and a purge stream from a wet scrubber in a spray dryer, wherein a portion of the acid gases is removed from the flue gas and a dry by-product is produced and said purge stream is evaporated;
    filtering the flue gas to remove fly ash and at least a portion of said dry by-product and causing further reduction of the acid gases;
    wet scrubbing the flue gas exiting said spray dryer in a wet scrubber as a polishing step for removal of acid gases and particulate;
    adding a limestone reagent to said wet scrubber, wherein said limestone reagent reacts with at least a portion of the remaining acid gases present in said wet scrubber to produce a wet scrubber by-product;
    discharging said purge stream from said wet scrubber to said spray dryer; and
    producing gypsum from said wet scrubber by-product.

2. A process according to claim 1, wherein activated carbon is injected into the flue gas upstream of said filtering step to remove mercury from the flue gas.

3. A process according to claim 1, wherein about 50 to 99.9 percent of the sulfur trioxide and other acid gases along with a portion of any sulfur dioxide present are removed from the flue gas in said spray dry absorbing treating step.

4. A process according to claim 1, wherein said treating step is adapted to minimize sulfur dioxide absorption while still removing about 50 to 99.9 percent of any sulfur trioxide and other acid gases.

5. A process according to claim 1, wherein about 50 to 99 percent of the remaining sulfur oxides and other acid gases are removed from the flue gas in said wet scrubbing step.

6. A process according to claim 1, wherein a fabric filter, electrostatic precipitator, or other particulate collection device is used in said filtering step.

7. A system for removing sulfur oxide, other acid gases, and particulate from a flue gas, said system comprising:
    a spray dryer for treating the flue gas and a slurry formed from water and an alkaline reagent, wherein a dry by-product is produced in said spray dryer;
    a filter for removing at least a portion of said dry by-product from the flue gas; and
    a wet scrubber for scrubbing the flue gas exiting said spray dryer, wherein said wet scrubber is configured to receive said dry by-product removed from the flue gas in said spray dryer.

8. A system according to claim 7, further comprising:
    means for removing particulate from the flue gas upstream of said spray dryer.

9. A system according to claim 7, further comprising:
    means for injecting activated carbon into the flue gas upstream of said filter to remove mercury from the flue gas.

10. A system according to claim 7, wherein said filter is one of a fabric filter and electrostatic precipitator.

11. A system according to claim 7, wherein about 50 to 99.9 percent of the sulfur trioxide and other acid gases along with a portion of the sulfur dioxide are removed from the flue gas in said spray dry absorbing treating step.

12. A system according to claim 7, wherein about 50 to 99 percent of the remaining sulfur oxides and other acid gases are removed from the flue gas in said wet scrubbing step.

13. A process for removing sulfur oxides, other acid gases, and particulate from a flue gas, said process comprising:
    treating the flue gas utilizing a slurry formed from water and an alkaline reagent in a spray dryer, wherein a portion of the acid gases is removed from the flue gas and a dry by-product is produced;
    filtering the flue gas to remove fly ash and at least a portion of said dry by-product and causing further reduction of the acid gases;
    adding said dry by-product to said wet scrubber;
    wet scrubbing the flue gas exiting said spray dryer in a wet scrubber as a polishing step for removal of acid gases and particulate; and
    adding a lime or limestone reagent to said wet scrubber, wherein said lime or limestone reagent reacts with at least a portion of the remaining acid gases present in said wet scrubber to produce a wet scrubber by-product.

* * * * *